United States Patent Office 3,403,444
Patented Oct. 1, 1968

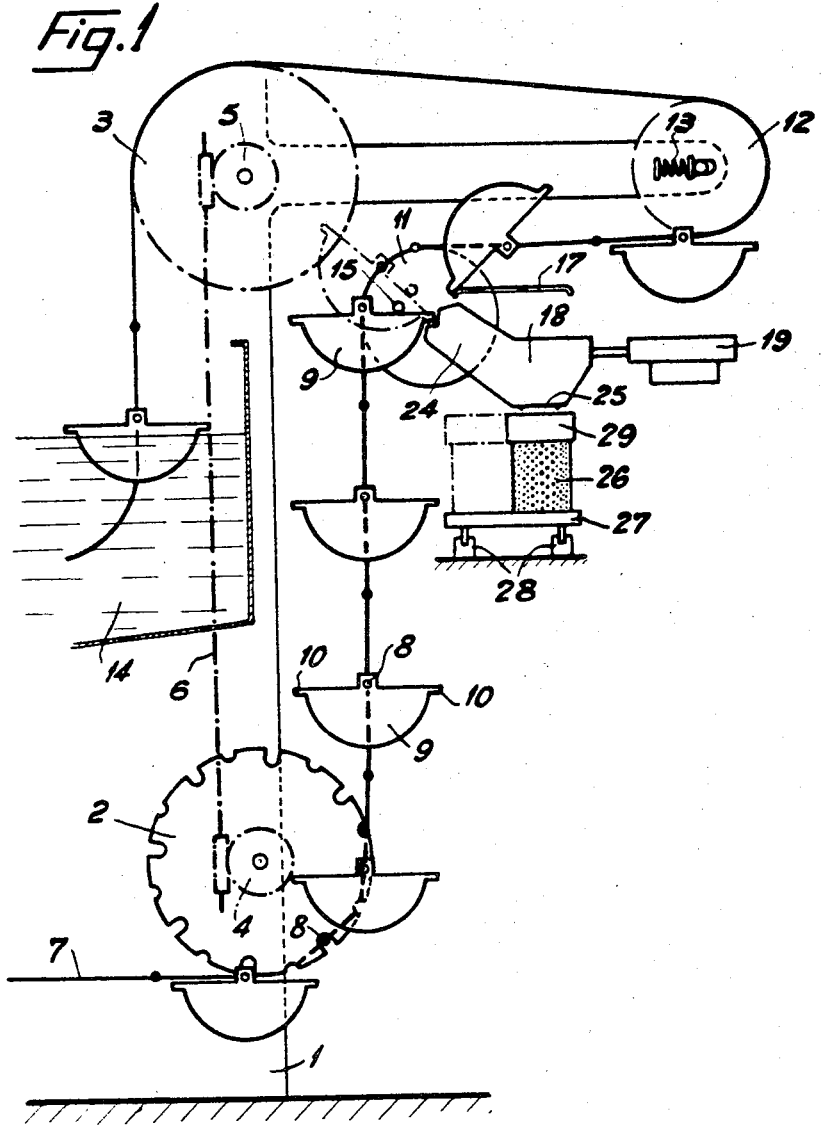

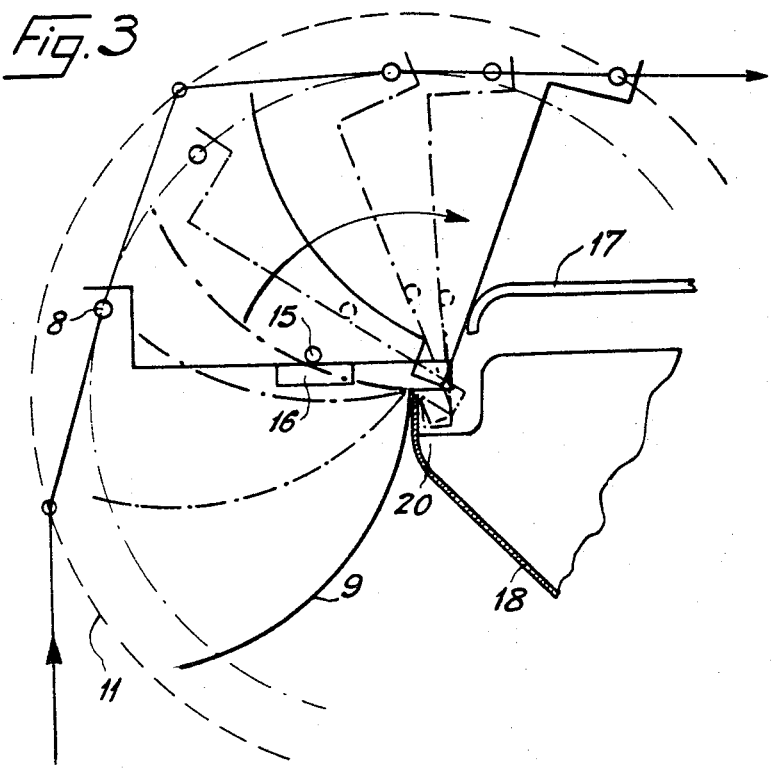
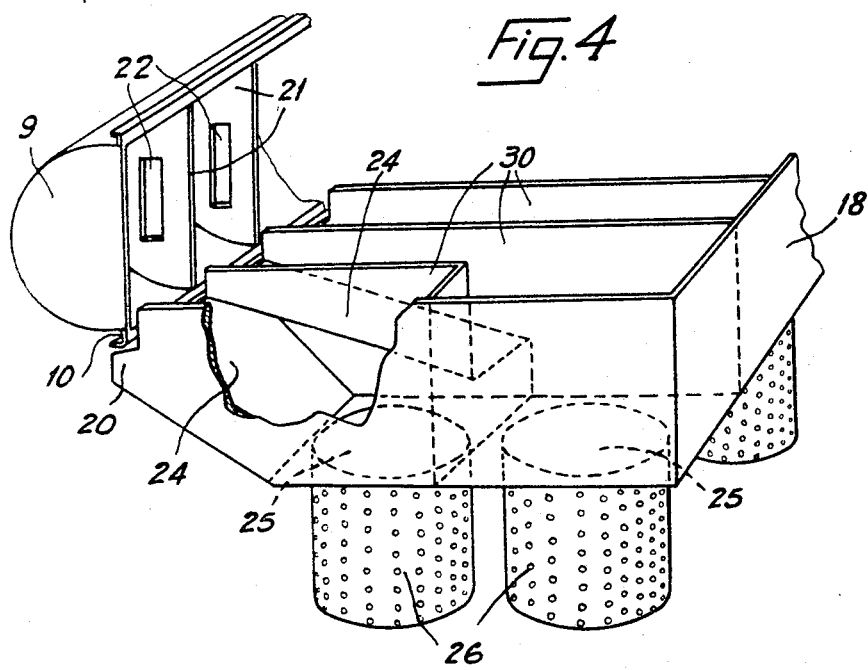

3,403,444
MACHINE FOR THE PRODUCTION OF CHEESE
Maurice F. M. E. Chollet, Loire-Atlantique, France, assignor to Ateliers et Chantiers de Nantes (Bretagne-Loire) Prairie au Duc, Nantes, Loire-Atlantique, France, a company of France
Filed Apr. 20, 1966, Ser. No. 543,960
Claims priority, application France, Apr. 22, 1965, 14,247
11 Claims. (Cl. 31—46)

ABSTRACT OF THE DISCLOSURE

A machine for handling curds used in the production of cheese, including a continuous chain conveyor having curd-carrying troughs pivotally mounted at spaced intervals thereon, said troughs being tippled in succession as each one arrives at a curd-unloading station by means of a finger which is mounted on a rotary wheel over which the conveyor chain is guided.

In French patent specification No. 1,363,307, for "Automatic Machines for the Production of Cheese," is described a machine for producing cheese, comprising a central moulding apparatus wherein are introduced, on one hand, a plurality of curd-carrying troughs supplied by an inflow conveyor and, on the other hand, empty mould members delivered by an outflow conveyor, the apparatus being effective to cause the curds to be poured into said mould members and to restore the empty troughs and the filled-up moulds back to their respective conveyors. Said inflow conveyor is associated with stations for filling the troughs, slicing the curds and washing up the empty troughs, respectively. The outflow conveyor comprises draining stations, mould-tippling and mould-stripping stations, as well as stations for washing the empty moulds.

While giving satisfactory results, in a general way, such machines are in fact inherently complicated through the use of the moulding apparatus requiring the troughs and the mould elements to be ceaselessly transferred, in both directions, between said apparatus and said conveyors.

It is an object of the present invention to provide an improved type of cheese production machine which, while having none of the above mentioned drawbacks, enables a substantial efficiency to be achieved.

The machine according to the invention comprises, as the one previously mentioned in the French patent specification, an inflow conveyor whereon the preparation of the curds may be effected in said troughs, and an outflow conveyor adapted to subject the paste contained in the moulds to the required operations leading to the mould-stripping.

An essential improvement of the invention resides in that the pouring of the trough contents into the moulds occurs without its being necessary to separate the troughs from the conveyor onto which they are arranged, thus considerably simplifying the moulding apparatus.

To this end, and according to one embodiment of the invention, said troughs are pivoted on the conveyor, the latter causing the troughs to pass into a pouring station, where they are tippled over above a channel or groove which directs the curds poured by the troughs into the moulds adapted to receive same.

Preferably, the troughs are divided into a plurality of compartments capable each of containing the curds necessary for filling one mould, said groove or channel being formed into several passageways corresponding to those of the compartments, thus enabling a whole range of moulds to be filled up at one time, resulting in a considerable increase of the efficiency or output of the machine.

The invention will be best understood from the following description and appended drawings, wherein:

FIGURE 1 is an elevational schematic view of the pouring station of a machine according to the invention.

FIGURE 2 is a partial, perspective view, illustrating a trough being mounted on the corresponding conveyor, and the device causing the pouring of the trough.

FIGURE 3 is a diagrammatic view illustrating the tippling-over operation of a trough.

FIGURE 4 is a perspective view of a channel assembly, with multiple passageways.

Figure 5:
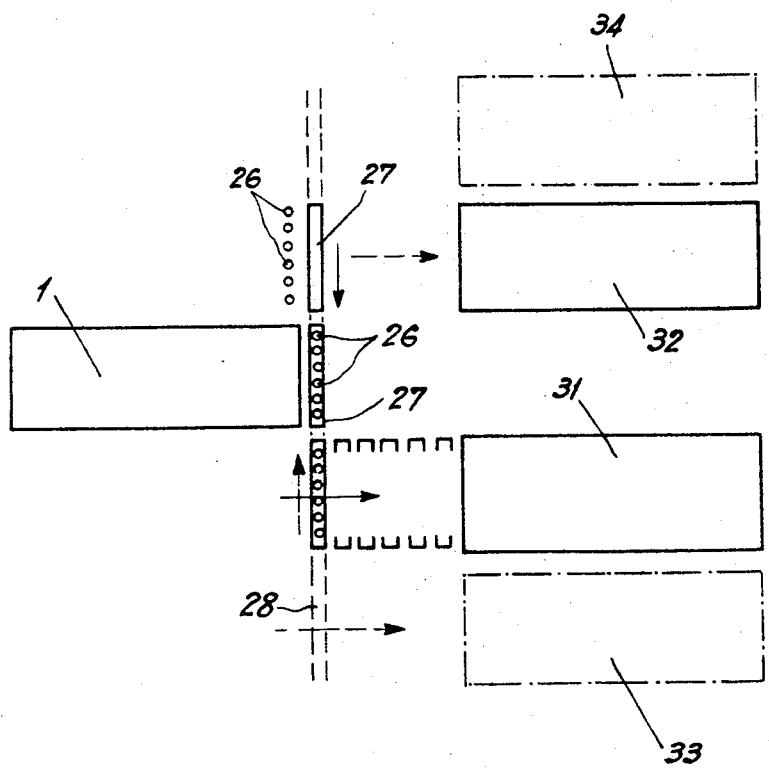
FIGURE 5 is a highly diagrammatic, over-all view of one embodiment of the machine of the invention.

In the example illustrated in FIGURE 1, that portion of an inflow conveyor only has been shown which is adjacent the moulding apparatus. For the remainder, this conveyor may be of a conventional type as disclosed in the above cited French patent specification No. 1,363,307.

A stand 1 carries pairs of driving wheels, 2 and 3, driven by means of pairs of worm and wheels 4 and 5 from a common shaft 6.

Over said wheels 2 and 3 chains 7 are passing, between which are linked, on upper axes 8, semi-cylindrical troughs 9, formed with side flanges or edges 10.

To pass from wheels 2 to wheels 3, the chains describe a path at right angles, being guided to this end by pairs of gear wheels 11 and 12, wheels 12 being associated with a device 13 for the adjustment of the tension.

At the output of wheels 3, the troughs pass through a washing tank 14. The gear wheels 11 are arranged in such a manner as to cause the tippling over of the troughs when these pass at the level thereof, and carry, to this end, and according to the distance separating two successive troughs (FIGURE 2), one or a plurality of dogs or fingers 15 arranged in such a manner that, upon the trough approximately reaching the level of the wheel axis, said dogs or fingers 15 engage angle-irons 16 secured on the sides of the trough adjacent said wheels, causing the trough to be tippled over the wheel axis, as the chain is progressing. The dog or dogs 15 are arranged in such a manner as to be located approximately within the plane passing through the tippling axis of the trough and through the rotating axis of the wheels 11 when hitting said angle-irons 16. Besides, the relative dimensions of the troughs and wheels 11 are such that the edge portion 10 of the trough is located substantially along the axis of rotation of the wheels at that instant, so that said edge rotates, in principle, about itself upon the trough being tippled over (FIGURE 3). Stationary inclines 17 are provided following the wheels 11 in order to maintain the troughs reversed, through their edges being supported, thus avoiding an untimely setting up position (FIGURE 3).

Slightly beneath the axis of the wheels 11, between these, is provided a channel 18 actuated by a lifting jack to cause said channel either to move back so as to leave a free passage for the troughs, or to move towards the same, so that a nose element 20 formed in said channel should engage under the edge 10 of the trough, located at the pouring station.

The troughs are separated by partitions 21 (FIGURES 2 and 4) forming compartments each containing the amount of curds corresponding to a cheese piece. Said partitions 21 are formed with holes 22 enabling to equalize the milk level in the various compartments when filling up the troughs. Channel 18 carries as many slanted passageways 24 as there are compartments in the troughs, these passageways leading to lower openings 25 which may possibly be arranged in two rows, as shown in FIGURE 4. When the channel is pushed on under the edge of the trough ready to be tippled over, the openings 25 are respectively located above the moulds 26 consisting of cylindrical shaped bodies with perforated holes, opened at both ends.

The mould members are carried by a plate 27 resting on a slideway 28, formed for instance of rails adapted to bring the range of moulds under the passageway or to the discharge location. Raisers such as 29 may be adapted on the moulds, as a function of the quantity of curds to be inserted thereinto.

FIGURES 3 and 4 illustrate the operation of the pouring mechanism. The trough 9, blocked relative to the wheels 11 by fingers or dogs 15, rotates with these wheels about the axis thereof and, little by little, the curds pour over from the trough compartments into the corresponding passageways, as defined by walls 30 (FIGURE 4), arranged in the same plane as each one of the trough walls 21. Thus, the contents of each compartment of the trough is gradually transferred into the corresponding mould. The inclines 17 prevent the trough from assuming its normal position under the action of gravity when being disengaged from the fingers 15, prior to the pouring operation being finished.

The use of troughs divided into compartments, and combined moreover with the channel of the type illustrated in FIGURE 4, enabling to simultaneously fill up two mould ranges at a time, results in a very important output of the machine.

FIGURE 5 illustrates an arrangement adapted to deal with such important outputs.

An inflow conveyor 1 is located in front of the filling station, as defined by a plate 27 loaded with moulds 26 and resting on rails 28.

A plurality of outflow conveyors 31, 32, 33, 34 are used in parallel, the empty mould being positioned on the plates 27 by an operator or by a convenient mechanism adapted to feed the filling station, and the plates carrying the filled-up moulds loaded, in turn, onto the outflow conveyors.

It is of course to be understood that modifications may be carried out in the embodiments shown, without departing from the spirit and scope of the invention.

What I claim is:

1. A machine for producing cheese comprising in combination: a conveyor having a pair of parallel chains and curd-receiving troughs pivotally linked to said chains, between them at regular intervals; a pair of guiding wheels cooperating with said chains for causing said troughs to follow a vertical and then a horizontal path; a moulding apparatus located in the vicinity of said pair of wheels below said horizontal path; a finger carried by at least one of said wheels and positioned to come into engagement with a portion of each of said troughs when it passes between said wheels, whereby said trough is tippled and the curd it contains is poured into said moulding apparatus, as the conveyor is advancing.

2. A machine according to claim 1, wherein when a trough passes between said wheels, the pivoting axis of said trough, said finger and the axis of said wheels are located in a same radial plane.

3. A machine according to claim 1, wherein guiding members are provided above said moulding apparatus to be engaged by said troughs in order to maintain them in a tippled position after they come out of engagement with said finger.

4. A machine according to claim 1, wherein said moulding apparatus is provided with a curd-receiving channel having a nose piece and each trough is provided with a flange adapted to be engaged on said nose piece when said trough is tippled.

5. A machine according to claim 4, wherein means are provided to move said channel towards and from said conveyor.

6. A machine according to claim 4, wherein said flange is located substantially along the axis of said wheels during the tippling movement of said troughs.

7. A machine according to claim 1, wherein said troughs are divided into compartments by means of partitions arranged perpendicular to their tippling axis, said channel being provided in the vicinity of said nose piece with partitions arranged substantially in the same plane as those of the troughs, said partitions in said channel defining passageways leading to moulds to be filled.

8. A machine according to claim 7, wherein outflow conveyors are associated with said moulding apparatus to allow deliverance of empty moulds and removal of filled-up moulds.

9. A machine according to claim 7, wherein said passageways are alternatively displaced in such a manner that the channel may serve to fill the moulds arranged in several parallel rows.

10. A machine according to claim 8, wherein, in view of the moulds being transferred onto the outflow conveyors, said moulds are placed on a support which may be moved transversely relative to said conveyors.

11. A machine according to claim 10, wherein said support is a plate movable along a guideway perpendicular to the axes of the conveyors and passing underneath the channel.

References Cited

UNITED STATES PATENTS

| 329,862 | 11/1885 | Stephens | 198—140 |
| 1,155,598 | 10/1915 | Mayers | 198—12 |
| 2,846,767 | 8/1958 | Hensgen et al. | 31—48 |
| 2,920,736 | 1/1960 | Kamarainen | 198—12 |
| 3,031,066 | 4/1962 | Leach | 198—140 |
| 3,047,951 | 8/1962 | Le Boeuf | 31—44 |
| 3,192,626 | 7/1965 | Le Boeuf | 31—46 X |

FOREIGN PATENTS

| 518,540 | 3/1955 | Italy. |

ALDRICH F. MEDBERY, *Primary Examiner.*